US008369119B2

(12) United States Patent
Nakamura et al.

(10) Patent No.: US 8,369,119 B2
(45) Date of Patent: Feb. 5, 2013

(54) INVERTER DRIVE POWER SUPPLY CIRCUIT FOR DRIVING A PLURALITY OF INVERTER SWITCHING DEVICES THAT FORM AN INVERTER CIRCUIT

(75) Inventors: Yasushi Nakamura, Nishio (JP); Kazuo Aoki, Anjo (JP)

(73) Assignee: Aisin AW Co., Ltd., Anjo (JP)

( * ) Notice: Subject to any disclaimer, the term of this patent is extended or adjusted under 35 U.S.C. 154(b) by 385 days.

(21) Appl. No.: 12/662,255

(22) Filed: Apr. 7, 2010

(65) Prior Publication Data

US 2010/0302820 A1    Dec. 2, 2010

(30) Foreign Application Priority Data

May 26, 2009    (JP) .................................. 2009-126493

(51) Int. Cl.
*H02M 7/538* (2007.01)
*H02M 3/335* (2006.01)
(52) U.S. Cl. ......................................... 363/133; 363/24
(58) Field of Classification Search .............. 363/22–26, 363/65, 71, 133–134
See application file for complete search history.

(56) References Cited

U.S. PATENT DOCUMENTS

| 4,150,425 | A | * | 4/1979 | Frosch et al. | ............. 363/56.06 |
| 4,222,098 | A | * | 9/1980 | Frosch et al. | .................. 363/71 |
| 6,282,102 | B1 | * | 8/2001 | Minamisawa et al. | ......... 363/16 |
| 2004/0223351 | A1 | * | 11/2004 | Kurokami et al. | ............. 363/65 |
| 2006/0092677 | A1 | * | 5/2006 | Moussaoui et al. | ............. 363/71 |

FOREIGN PATENT DOCUMENTS

| JP | A-63-11064 | 1/1988 |
| JP | A 11-178356 | 7/1999 |
| JP | A 2006-280148 | 10/2006 |
| JP | A-2009-55745 | 3/2009 |

OTHER PUBLICATIONS

International Search Report mailed Jul. 20, 2010 in International Application No. PCT/JP2010/056572 (with translation).

* cited by examiner

*Primary Examiner* — Adolf Berhane
*Assistant Examiner* — Jeffrey Gblende
(74) *Attorney, Agent, or Firm* — Oliff & Berridge, PLC

(57) ABSTRACT

An inverter drive power supply circuit for driving a plurality of inverter switching devices that form an inverter circuit, includes a number N of transformers (N is an integer equal to or larger than 2) adapted to a push-pull method, each having a first winding and a second winding for a primary winding and a first winding and a second winding for a secondary winding, and supplying an output voltage of the secondary winding to the inverter switching devices.

2 Claims, 10 Drawing Sheets

F I G . 1
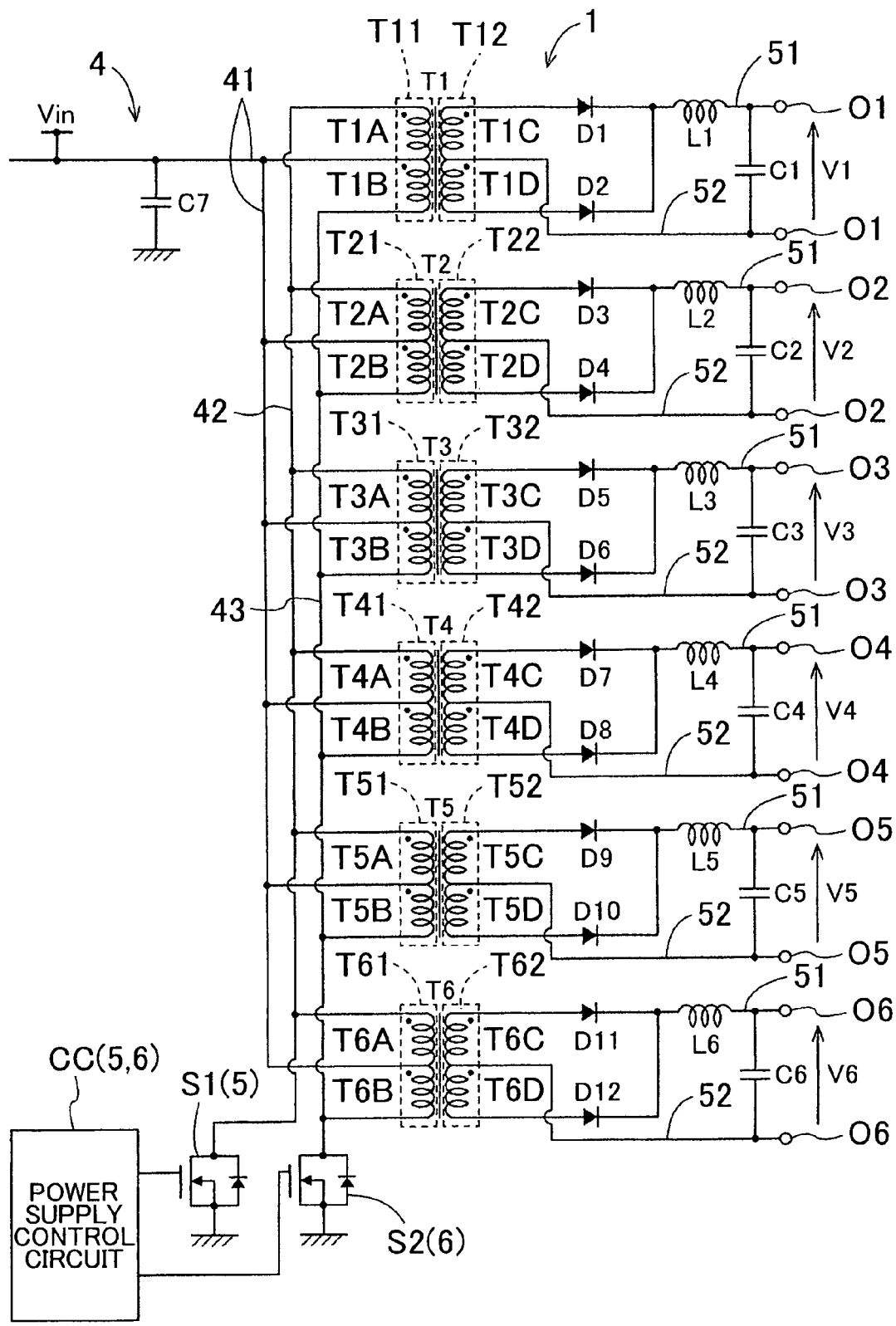

V-T1A

V-T1B

I-T1A

I-T1B

V-T1C

V-T1D

I-D1

I-D2

I-L1

V-T1A

I-T1A

V-T1C

V-T1D

I-D1

I-D2

I-L1

V-T2A

V-T2B

I-T2A

I-T2B

V-T2C

V-T2D

I-D3

I-D4

I-L2

FIG. 9A
V-T1AB
FIG. 9B
I-T1AB
FIG. 9C
V-T1C
FIG. 9D
V-T1D
FIG. 9E
I-D1
FIG. 9F
I-D2
FIG. 9G
I-L1
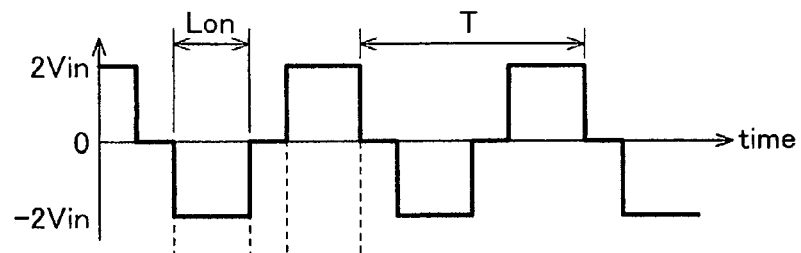
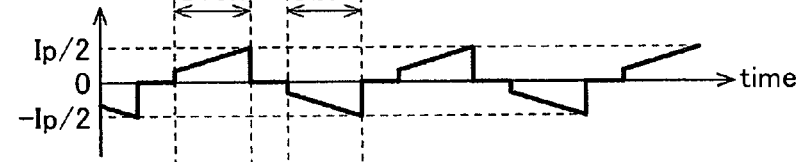
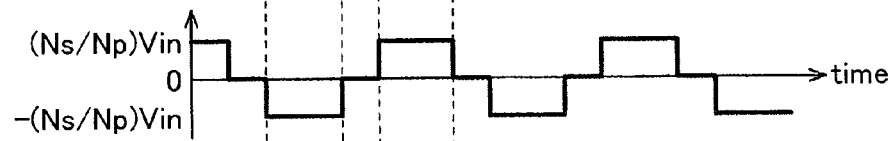
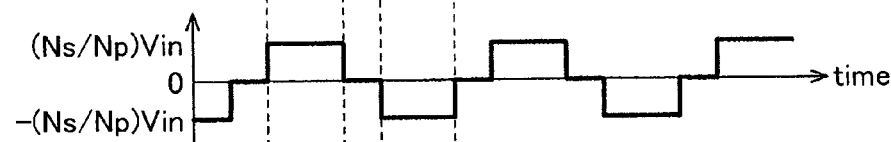

V-T2A

V-T2B

I-T2A

I-T2B

V-T2C

V-T2D

I-D3

I-D4

I-L2

INVERTER DRIVE POWER SUPPLY CIRCUIT FOR DRIVING A PLURALITY OF INVERTER SWITCHING DEVICES THAT FORM AN INVERTER CIRCUIT

INCORPORATION BY REFERENCE

The disclosure of Japanese Patent Application No. 2009-126493 filed on May 26, 2009 including the specification, drawings and abstract is incorporated herein by reference in its entirety.

BACKGROUND

The present invention relates to an inverter drive power supply circuit for driving a plurality of inverter switching devices that form an inverter circuit.

In order to drive a plurality of inverter switching devices that form an inverter circuit, floating power sources that are insulated from each other and supply an output voltage to the respective inverter switching devices are sometimes used. For example, Japanese Patent Application Publication No. JP-A-H11-178356 shown below describes the structure of a flyback power supply circuit that includes six transformers each having a primary winding and a secondary winding, and supplying an output voltage of the corresponding secondary winding to the corresponding inverter switching device, where the six primary windings are connected in parallel to a primary-side power source. This power supply circuit has a control circuit for monitoring the output voltage of the secondary winding to control the voltage of the primary-side power source.

SUMMARY

The structure of the power supply circuit described in Japanese Patent Application Publication No. JP-A-H11-178356 has the following problem. If a failure, such as a disconnection of the primary winding or a defective contact due to solder cracks in an input terminal to the primary winding, occurs even at one location in any of the plurality of transformers, the output voltage of the secondary winding of this transformer decreases, making it impossible to perform normal inverter drive control. For example, when this inverter circuit is a circuit for driving an electric motor, such a decrease in output voltage of the secondary winding may make it impossible to control the electric motor.

Thus, it has been desired to implement inverter drive power supply circuits capable of suppressing a decrease in output voltage of a secondary winding and performing a normal inverter operation, even if a failure, such as a disconnection of a primary winding or a defective contact, occurs.

In order to achieve the above object, an inverter drive power supply circuit for driving a plurality of inverter switching devices of an inverter circuit according to a first aspect of the present invention has a characteristic structure in which the inverter drive power supply circuit includes a number N of transformers (N is an integer equal to or larger than 2) adapted to a push-pull method, each having a first winding and a second winding for a primary winding and a first winding and a second winding for a secondary winding, and supplying an output voltage of the secondary winding to the inverter switching devices, and the respective first windings of the number N of the primary windings are connected in parallel to a primary-side power source that is controlled by a first power supply control section, and the respective second windings of the number N of the primary windings are connected in parallel to the primary-side power source that is controlled by a second power supply control section, and a saturation magnetic flux density of a core of each transformer is set to a value that is equal to or higher than $\{1+1/(N-1)\}$ times a required saturation magnetic flux density, which is a minimum saturation magnetic flux density required to prevent magnetic saturation from being caused even by a largest value of a current that flows in the primary windings in a normal state where there is no defective portion in the circuit in which the number N of the transformers are formed.

According to this characteristic structure, even if a failure, such as a disconnection or a defective contact, occurs in a portion of a wiring in the primary winding of any of the number N of the transformers, a decrease in output voltage of the secondary windings of the transformers including the transformer in which a failure has occurred is suppressed, whereby a normal inverter operation can be performed. That is, the respective first windings of the number N of the primary windings are connected in parallel to the primary-side power source that is controlled by the first power supply control section, and the respective second windings of the number N of the primary windings are connected in parallel to the primary-side power source that is controlled by the second power supply control section. Thus, if a failure occurs in a portion of a wiring in the primary winding of any of the number N of the transformers, a potential at both ends of a winding that forms a circuit that does not extend through the portion of the primary wiring in which the failure has occurred becomes equal to a potential of a portion corresponding to the primary winding in each transformer where a failure has not occurred. This enables the transformer in which a failure has occurred to operate similarly to the transformers in which a failure has not occurred, whereby the output voltage of the secondary winding of the transformer in which a failure has occurred can be ensured similarly to that of the transformers in which a failure has not occurred.

At this time, a current flowing in the primary winding in which a failure has occurred is equally divided, and the resultant currents respectively flow in the primary winding of one or more transformers where a failure has not occurred in addition to the current that flows in the normal state. However, according to the above characteristic structure, the saturation magnetic flux density of the core of each transformer is set to a value that is equal to or higher than $\{1+1/(N-1)\}$ times the required saturation magnetic flux density, which is the minimum saturation magnetic flux density required to prevent magnetic saturation from being caused in the normal state. Thus, magnetic saturation can be prevented from occurring in the core of the primary winding of the transformer in which a failure has not occurred. Therefore, the current flowing in the primary winding of the transformer in which a failure has occurred can be supplied from the other transformers in which a failure has not occurred. As a result, the primary winding of the transformer in which a failure has occurred can be reliably made to operate in a manner similar to that of the transformers in which a failure has not occurred.

BRIEF DESCRIPTION OF THE DRAWINGS

FIG. 1 is a diagram showing the structure of a power supply circuit according to an embodiment of the present invention;

FIGS. 9A to 9G are timing charts illustrating the operation of the power supply circuit according to the embodiment of the present invention when a failure has occurred in a midpoint tap of the primary winding.

DETAILED DESCRIPTION OF EMBODIMENTS

Figure 2:
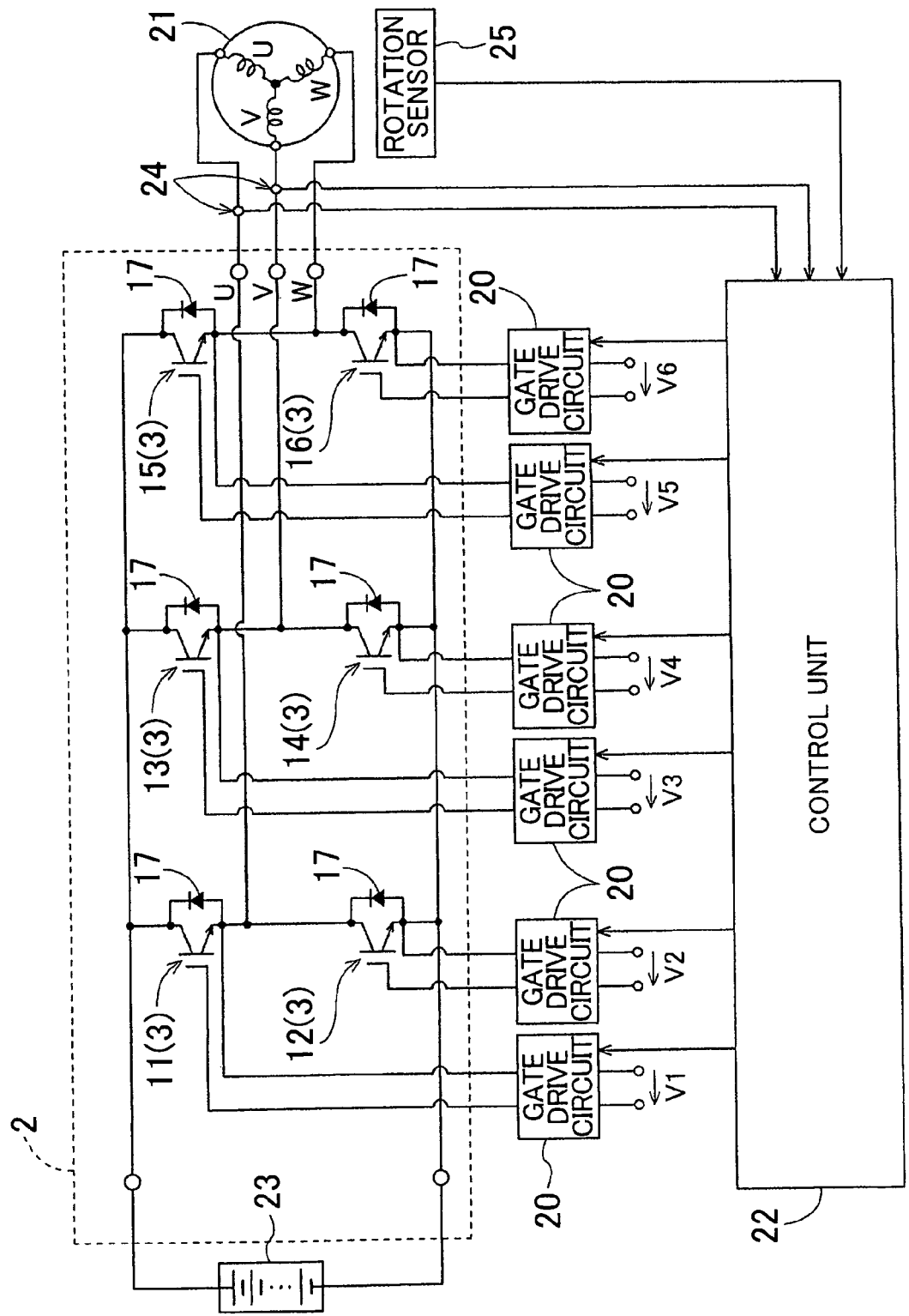
FIG. 2 is a diagram showing the structure of an inverter circuit according to the embodiment of the present invention.

An embodiment of the present invention will be described below with reference to the accompanying drawings. An inverter drive power supply circuit 1 (hereinafter simply referred to as the "power supply circuit 1") according to the present invention is a power supply circuit for driving a plurality of inverter switching devices 3 that form an inverter circuit 2. The present embodiment will be described with respect to an example in which the inverter circuit 2 is structured as a circuit for driving an electric motor 21. As shown in FIG. 2, the electric motor 21 is a three-phase alternating current (AC) electric motor, and the inverter circuit 2 has a pair of inverter switching devices 3 for each of the three phases of the electric motor 21. That is, the inverter circuit 2 has a total of six inverter switching devices 3. On the other hand, as shown in FIG. 1, the power supply circuit 1 is structured as a push-pull switching power source. The power supply circuit 1 includes six transformers, that is, first to sixth transformers T1 to T6, in order to supply a drive voltage to each inverter switching device 3, and is structured to output substantially the same output voltages V1 to V6 between each of six sets of output terminals O1 to O6. The power supply circuit 1 is characterized in that, even if a failure, such as a disconnection or a defective contact, or the like occurs in a portion of a wiring in primary windings T11 to T61 of any of the six transformers T1 to T6, a decrease in output voltage V1 to V6 of each transformer T1 to T6 including the transformer in which the failure has occurred, is suppressed such that the inverter circuit 2 is normally operated. The power supply circuit 1 will be described in detail below.

1. Structure of the Power Supply Circuit

First, the structure of the power supply circuit 1 of the present embodiment will be described. As shown in FIG. 1, the power supply circuit 1 is structured as a push-pull switching power source; and includes six transformers T1 to T6 adapted to the push-pull method. The transformers T1 to T6 have the primary windings T11 to T61 and the secondary windings T12 to T62, respectively. The primary windings T11 to T61 are connected to a primary-side power source 4, and the respective output voltages V1 to V6 of the secondary windings T12 to T62 are respectively supplied to the six inverter switching devices 3 of the inverter circuit 2 described below. The power supply circuit 1 is a floating power source in which the six sets of output terminals O1 to O6 for outputting the output voltages V1 to V6, respectively, are insulated from each other.

The primary windings T11 to T61 and the secondary windings T12 to T62 of the transformers T1 to T6 each include two windings in order to adapt to the push-pull method. That is, the primary windings T11 to T61 include first windings T1A to T6A and second windings T1B to T6B, respectively, and the secondary windings T12 to T62 include first windings T1C to T6C and second windings T1D to T6D, respectively. In each primary winding T11 to T61, an end of the first winding T1A to T6A and an end of the second winding T1B to T6B are connected to each other via a midpoint tap. Similarly, in each secondary winding T12 to T62, an end of the first winding T1C to T6C and an end of the second winding T1D to T6D are connected to each other via a midpoint tap. In the present embodiment, the first windings T1A to T6A and the second windings T1B to T6B of the primary windings T11 to T61 have the same number of turns "Np," and the first windings T1C to T6C and the second windings T1D to T6D of the secondary windings T12 to T62 have the same number of turns "Ns." Note that the values Np, Ns can be set as appropriate, and the transformation ratio of each transformer T1 to T6 is determined by "Ns/Np." A black dot shown at one end of each winding in FIG. 1 indicates the polarity of each winding. Thus, the polarities of the windings are set such that the first windings T1A to T6A and the second windings T1B to T6B of the primary windings T11 to T61 have the same polarity, and the first windings T1C to T6C and the second windings T1D to T6D of the secondary windings T12 to T62 have the same polarity.

The primary-side power source 4 is a power source for supplying a primary-side voltage Vin to the primary windings T11 to T61 of the transformers T1 to T6. Thus, a positive line 41 of the primary-side power source 4, to which the primary-side voltage Vin is applied, is connected to the midpoint tap of each primary winding T11 to T61, which is a junction between the first winding T1A to T6A and the second winding T1B to T6B of each primary winding T11 to T61. The primary-side voltage Vin that is applied to the positive line 41 is smoothed by a primary-side voltage smoothing capacitor C7. In the present embodiment, the primary-side voltage Vin is set to a value that is significantly lower than the voltage of an electric-motor driving power source 23 described below, and is set to, e.g., about several to several tens of volts. The power supply circuit 1 has a first drive line 42 and a second drive line 43 as wirings for controlling driving of the primary-side voltage Vin of each transformer T1 to T6. The first drive line 42 is connected to an end (an end point) located on the side opposite to the midpoint tap in each first winding T1A to T6A, and is connected to the ground via a first power supply switching device S1 that is common to the six first windings T1A to T6A. Similarly, the second drive line 43 is connected to an end (an end point) located on the side opposite to the midpoint tap in the second winding T1B to T6B of each primary winding T11 to T61, and is connected to the ground via a second power supply switching device S2 that is common to the six second windings T1B to T6B. Thus, the first windings T1A to T6A of the six primary windings T11 to T61 are connected in parallel to the primary-side power source 4, and the second windings T1B to T6B of the six primary windings T11 to T61 are connected in parallel to the same primary-side power source 4. Note that, in the description of the present embodiment, the respective ends located on the side opposite to the respective midpoint taps in the first windings T1A to T6A, T1C to T6C and the second windings T1B to T6B, T1D to T6D that form the primary windings T11 to T61 and the second windings T12 to T62 will be referred to as the "end points" as appropriate.

In the present embodiment, field effect transistors (FETs) are used as the first power supply switching device S1 and the second power supply switching device S2. Driving of the first power supply switching device S1 and the second power supply switching device S2 is controlled by a power supply control circuit CC. Specifically, in response to a predetermined drive voltage (a gate drive voltage) applied from the power supply control circuit CC, the first power supply switching device Si and the second power supply switching device S2 are turned on to connect the first drive line 42 or the second drive line 43 to the ground. In the state where no drive voltage is applied from the power supply control circuit CC, the first power supply switching device S1 and the second power supply switching device S2 are off, and release the first drive line 42 or the second drive line 43 from the ground. As described below, the power supply control circuit CC performs a push-pull power supply by alternately tuning on the first power supply switching device S1 and the second power supply switching device S2. Thus, the voltage, which is applied to the six parallel connected first windings T1A to T6A, is controlled by the first power supply switching device S1 and the power supply control circuit CC, and the voltage, which is applied to the six parallel connected second windings T1B to T6B, is controlled by the second power supply switching device S2 and the power supply control circuit CC. Thus, in the present embodiment, a first power supply control section 5 of the present invention is formed by the power supply control circuit CC and the first power supply switching device S1, and a second power supply control section 6 of the present invention is formed by the power supply control circuit CC and the second power supply switching device S2.

The transformers T1 to T6 each have the same structure from the secondary winding T12 to T62 to the output terminals O1 to O6. Thus, the first transformer T1. will be described representatively below. The output voltage V1 of the secondary winding T12 of the first transformer T1 is output between the output terminals O1. The output terminals O1 are formed by an output-side end of an output positive line 51, and an output side end of an output negative line 52, respectively. The midpoint tap, which is a junction between the first winding T1C and the second winding T1D of the secondary winding T12, is connected to the output negative line 52. The end (the end point) located on the side opposite to the midpoint tap in the first winding TIC of the secondary winding T12 is connected to the output positive line 51 via a first diode D1 for restricting a current flowing in a direction from the output terminals 01 toward the secondary winding T12. The end (the end point) located on the side opposite to the midpoint tap in the second winding T1D of the secondary winding T12 is connected to the output positive line 51 via a second diode D2 for restricting a current flowing in a direction from the output terminals O1 toward the second winding T12. A first inductor L1 is connected in series with the output positive line 51, which is a line located on the output terminal O1 side of a junction between an output line of the first diode D1 and an output line of the second diode D2. A first output smoothing capacitor C1 is provided between the output positive line 51 and the output negative line 52 at a position located on the output terminal O1 side of the first inductor L1 on the output positive line 51. The first inductor L1 and the first output smoothing capacitor C1 are provided in order to smooth the output voltage V1. Note that the structure having no first inductor L1 is also preferable.

The structure from the secondary windings T22 to T62 to the respective output terminals O2 to O6 in the second to sixth transformers T2 to T6 is similar to that in the first transformer T1 except that the names of the corresponding parts are replaced as appropriate with a third diode D3 to a twelfth diode T12, a second inductor L2 to a sixth inductor L6, a second output smoothing capacitor C2 to a sixth output smoothing capacitor C6, and the like. Thus, detailed description thereof will be omitted.

In the power supply circuit 1, the saturation magnetic flux density of the core of each transformer T1 to T6 is set appropriately so that, even if a failure, such as a disconnection or a defective contact, or the like occurs in a portion of a wiring in the primary winding T11 to T61 of any of the six transformers T1 to T6, a decrease in output voltage V1 to V6 of each transformer T1 to T6 including the transformer in which the failure has occurred can be suppressed. Specifically, the core of each transformer T1 to T6 is set so that the saturation magnetic flux density Bs of each core is at least 6/5 times a required saturation magnetic flux density Bn. The "required saturation magnetic flux density Bn" refers to the minimum saturation magnetic flux density required to prevent magnetic saturation from being caused even by the largest value of the current that flows in the primary windings T11 to T61 in the normal state where there is no defective portion in the circuit of the six transformers T1 to T6.

Although the present embodiment is described with respect to an example in which the power supply circuit 1 includes six transformers. However, in the case where the power supply circuit 1 includes a plurality of transformers, the saturation magnetic flux density Bs of the core of each transformer can be represented by the following general expression (1) by using the number of transformers, "N," included in the power supply circuit 1, and the required saturation magnetic flux density Bn of each core.

$$Bs \geq \{1 + 1/(N-1)\}Bn \qquad (1)$$

In the above expression, N is an integer equal to or larger than 2. That is, as shown by this expression (1), the saturation magnetic flux density Bs of the core of each of the number N of the transformers is set to a value that is equal to or larger than $(1+1/(N-1))$ times the required saturation magnetic flux density Bn. The saturation magnetic flux density Bs is set in this manner by appropriately determining the material, structure, shape, and the like of the core.

2. Structure of the Inverter Circuit

The structure of the inverter circuit 2 of the present embodiment will be described below with reference to FIG. 2. The inverter circuit 2 is a circuit for converting a direct current (DC) voltage of the electric-motor driving power source 23 to an alternating current (AC) voltage to supply the AC voltage to the electric motor 21. The voltage of the electric-motor driving power source 23 is set to a value that is significantly higher than the primary-side voltage Vin described above, and is set to, e.g., several hundreds of volts.

The inverter circuit 2 includes a plurality of inverter switching devices 3 and a plurality of freewheel diodes 17. The inverter circuit 2 includes a pair of switching devices for each phase (U-phase, V-phase, and W-phase) of the electric motor 21. Specifically, the inverter circuit 2 includes six switching devices, which are a U-phase upper arm device 11 and a U-phase lower arm device 12, a V-phase upper arm device 13 and a V-phase lower arm device 14, and a W-phase upper arm device 15 and a W-phase lower arm device 16. Note that, in the present embodiment, these inverter switching devices are simply referred to as the "inverter switching devices 3" unless the individual devices 11 to 16 are specifically mentioned. In the present embodiment, insulated gate bipolar transistors (IGBTs) are used as the six switching devices 3. The emitter of each of the upper arm devices 11, 13, 15 and the collector of each of the lower arm devices 12, 14, 16 of the three phases are connected to the coil of the corresponding phase of the electric motor 21. Moreover, the collector of each of the upper arm device 11, 13, 15 of the three phases is connected to the positive side of the electric-motor driving power source 23, and the emitter of each of the lower arm device 12, 14, 16 is connected to the negative side of the electric-motor driving power source 23. The freewheel diodes 17 are connected in parallel to the inverter switching devices 3, respectively.

Each of the output voltages V1 to V6 of the power supply circuit 1 is applied as a gate drive voltage between the gate and the emitter of the corresponding inverter switching device 3 via a corresponding gate drive circuits 20. Each gate drive circuit 20 is turned on and off according to a gate drive signal as a switching control signal that is output from a control unit 22. When the gate drive circuit 20 is turned on, the output voltage V1 to V6 is applied between the gate and the emitter of the inverter switching device 3, whereby the inverter switching device 3 is turned on. On the other hand, when the gate drive circuit 20 is turned off, the voltage between the gate and the emitter of the inverter switching device 3 becomes zero, whereby the inverter switching device 3 is turned off. The inverter switching devices 3 are switched by pulse width modulation (PWM) control or the like, according to the gate drive signal. Thus, the inverter circuit 2 converts a DC voltage of the electric-motor driving power source 23 to an AC voltage, and supplies the AC voltage to the electric motor 21 to drive the electric motor 21. Note that, in the case where the electric motor 21 functions as an electric generator, the inverter circuit 2 converts the generated AC voltage to the DC voltage, and supplies the DC voltage to the electric-motor driving power source 23.

A current of each phase, which flows between the inverter circuit 2 and the coil of each phase of the electric motor 21, is detected by a current sensors 24, and is output to the control unit 22. Note that only currents of two phases, which are U-phase and V-phase, are measured by the current sensors 24 in the example shown in FIG. 2. The currents of the three phases, U-phase, V-phase, and W-phase, are in a balanced state, and the sum of instantaneous current values of the three phases is zero. Thus, it is enough to measure the currents of two phases, and the current of the remaining one phase can be obtained by calculation. The magnetic pole position of the rotor of the electric motor 21 at each moment is detected by a rotation sensor 25, and is output to the control unit 22. The rotation sensor 25 is formed by, e.g., a resolver or the like. The magnetic pole position represents the rotation angle of the rotor as an electrical angle.

3. Operation of the Power Supply Circuit in a Normal State

Figure 3:
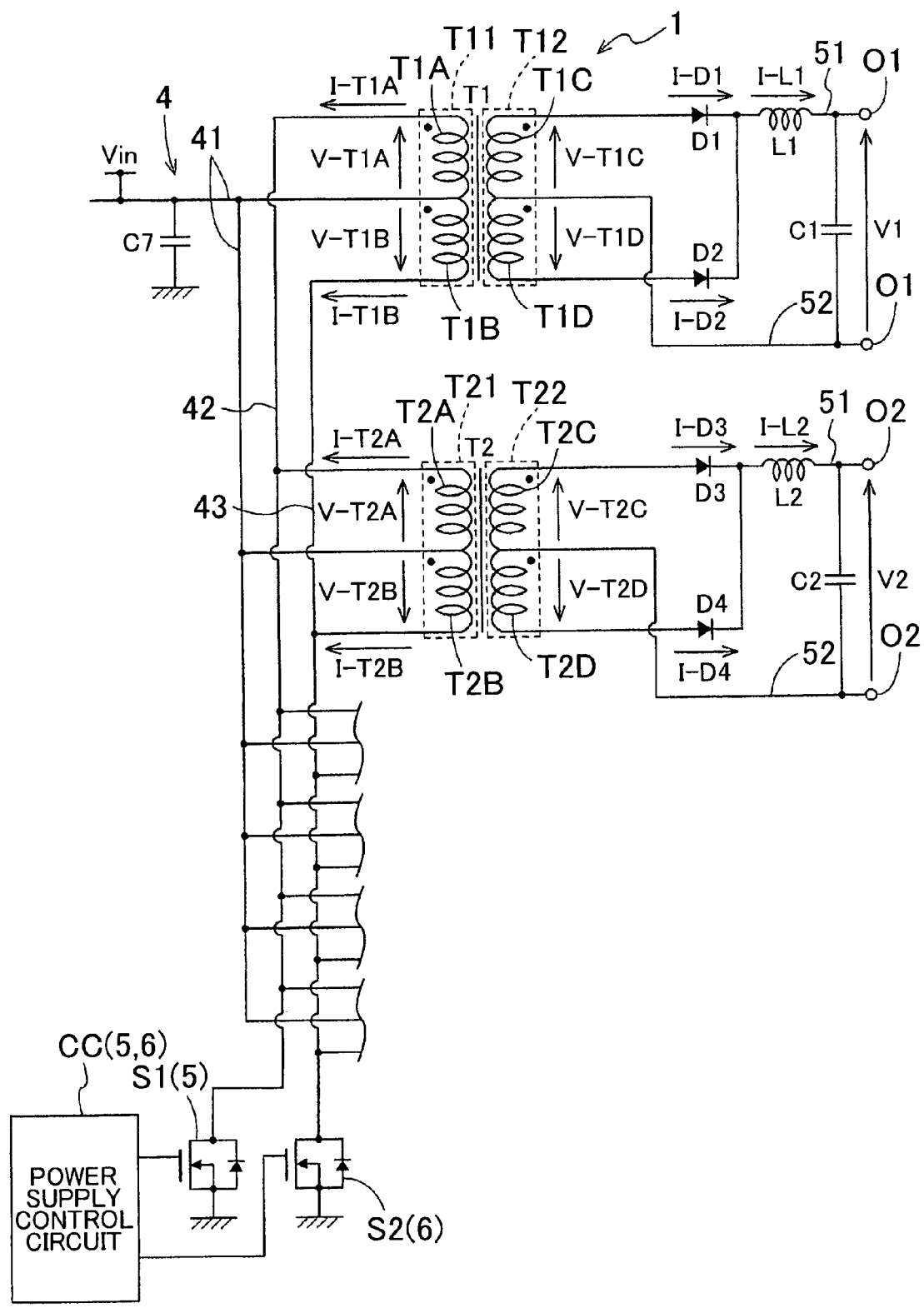
FIG. 3 is a circuit diagram illustrating an operation in a normal state according to the power supply circuit of the embodiment of the present invention.

An operation of the power supply circuit 1 of the present embodiment in the normal state will be described with reference to FIGS. 3 and 4. Note that, although the power supply circuit 1 includes six transformers T1 to T6, portions associated with the transformers T3 to T6 other than the first and second transformers T1, T2 are omitted in FIG. 3 and in the circuit diagrams of FIGS. 5 and 8 that are used to describe an operation in the event of a failure. FIGS. 4A to 4I, and FIGS. 6A to 6G, 7A to 7I, 9A to 9G, and 10A to 10I that are used to describe the operation in the event of a failure are timing charts showing a change with time of the voltage or the current of each portion during operation of the power supply circuit 1. Each voltage or current value shown in the timing charts of FIGS. 4A to 4I indicates a value that is obtained based on the direction shown by arrow in each portion in the circuit diagram of FIG. 3. That is, regarding the voltage value, the base end of the arrow is a reference potential (0 V). The voltage value is positive when the potential on the tip side of the arrow is higher than the reference potential, and is negative when the potential on the tip side of the arrow is lower than the reference potential. Regarding the current value, a current flowing in a direction from the base end of the arrow toward the tip thereof is positive, and a current flowing in a direction opposite thereto is negative. The same applies to the relation between the circuit diagram of FIG. 5 and the timing charts of FIGS. 6 and 7, and the relation between the circuit diagram of FIG. 8 and the timing charts of FIGS. 9 and 10.

Since the six transformers T1 to T6 operate in the same manner during operation in the normal state, only an operation of a portion associated with the first transformer T1 of the power supply circuit 1 will be described below. During operation of the power supply circuit 1, the first power supply switching device S1 and the second power supply switching device S2 are alternately turned on by the power supply control circuit CC. In this example, the respective on/off waveforms of the power supply switching devices S1, S2 have a phase difference of 180° from each other. The on-duty of each power supply switching device S1, S2 is set to less than 50%, and a dead time is provided between an "on" period S1*on* of the first power supply switching device S1 and an "On" period S2*on* of the second power supply switching device S2. Note that the on-duty of each power supply switching device S1, S2 is obtained by dividing the length Lon of the "on" period S1*on*, S2*on* Of the power supply switching device S1, S2 by a cycle T of the on-off operation of the power supply switching device S1, S2.

Figure 4A:
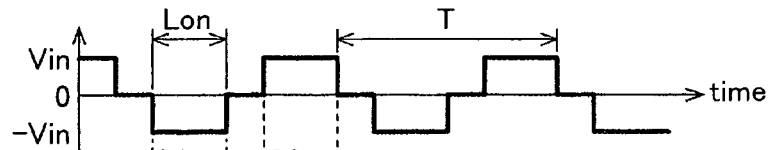
FIGS. 4A to 4I show timing charts illustrating an operation in a normal state of the power supply circuit according to the embodiment of the present invention.
Figure 4B:
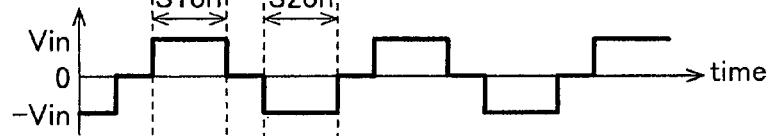
Figure 4C:
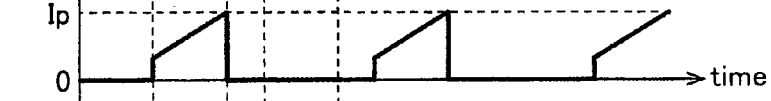

First, an operation of the primary winding T11 side of the transformer T1 will be described with reference to FIGS. 4A through 4D. When the first power supply switching device S1 is turned on, the potential at the end point of the first winding T1A becomes equal to the ground potential (0 V). At this time, the potential at the midpoint tap of the primary winding T11 is equal to the primary-side voltage Vin. Thus, as shown in FIG. 4A, a voltage V-T1A of the first winding T1A based on the potential at the midpoint tap is "−Vin" V during the "on" period S1*on* of the first power supply switching device S1. Since the first winding T1A and the second winding T1B of the primary winding T11 have the same number of turns (Np) and the same polarity, a voltage of the same magnitude and the same direction as those of the voltage of the first winding T1A is generated in the second winding T1B of the primary winding T11 by mutual induction. Thus, as shown in FIG. 4B, a voltage V-T1B of the second winding T1B based on the potential at the midpoint tap is "Vin" V during the "on" period S1*on* of the first power supply switching device S1. At this time, as shown in FIG. 4C, a current I-T1A flowing in a direction from the midpoint tap toward the end point in the first winding T1A instantaneously increases to a fixed value, and then, gradually increases with time. The largest value of the current I-T1A reached at the end of the "on" period S1*on* of the first power supply switching device S1 is "Ip." On the other hand, since the second power supply switching device S2 is off, no current flows in the second winding T1B, and as shown in FIG. 4D, a current I-T1B flowing in a direction from the midpoint tap toward the end point in the second winding T1B is "0."

When the second power supply switching device S2 is turned on, the potential at the end point of the second winding T1B becomes equal to the ground potential (0 V). At this time, the potential at the midpoint tap of the primary winding T11 is equal to the primary-side voltage Vin. Thus, as shown in FIG. 4B, the voltage V-T1B of the second winding T1B is "−Vin" V during the "on" period S2on of the second power supply switching device S2. At this time, a voltage of the same magnitude and the same direction as those of the voltage of the second winding T1B is generated in the first winding T1A of the primary winding T11 by mutual induction. Thus, as shown in FIG. 4A, the voltage V-T1A of the first winding T1A is "Vin" V during the "on" period of the second power supply switching device S2. At this time, as shown in FIG. 4D, the current I-T1B flowing in the second winding T1B instantaneously increases to a fixed value, and then, gradually increases with time. The largest value of the current I-T1B reached at the end of the "on" period S2on of the second power supply switching device S2 is "Ip," which is the same as the largest value of the current I-T1A. On the other hand, since the first power supply switching device S1 is off, no current flows in the first winding T1A, and as shown in FIG. 4C, the current I-T1A flowing in the first winding TIA is "0." Note that, during the dead time in which both the first power supply switching device S1 and the second power supply switching device S2 are off, all of the voltage V-T1A, the voltage V-T1B, the current I-T1A, and the current I-T1B are "0."

An operation on the secondary winding T12 side of the transformer T1 will be described below with reference to FIGS. 4E through 4I. As described above, when the first power supply switching device S1 is turned on, the current I-T1A flowing in the first winding T1A of the primary winding T11 gradually increases with time, as shown in FIG. 4C. The number of turns of the first winding T1A and the second winding T1B of the primary winding T11 is "Np," and the number of turns of the first winding T1C and the second winding T1D of the secondary winding T12 is "Ns." Thus, as shown in FIG. 4E, during the "on" period S1on of the first power supply switching device S1, a voltage V-T1C of the first winding TIC based on the potential at the midpoint tap is "−(Ns/Np)Vin" V due to mutual induction of the transformer T1. At this time, since the first diode D1 is reversely biased, no current flows in the first winding T1C of the secondary winding T12, and as shown in FIG. 4G, a current I-D1 flowing in the first diode D1 toward the output positive line 51 is "0." On the other hand, as shown in FIG. 4F, during the "on" period S1on of the first power supply switching device S1, the voltage V-T1D of the second winding T1D based on the potential at the midpoint tap is "(Ns/Np)Vin" V due to mutual induction of the transformer T1. At this time, since the second diode D2 is forward biased, a current flows in a direction from the midpoint tap toward the end point in the second winding T1D of the secondary winding T12. Specifically, as shown in FIG. 4H, a current I-D2 flowing in the second diode D2 toward the output positive line 51 instantaneously increases to the same value as that of a current I-L1 (see FIG. 4I) that had flown in the first inductor L1 immediately before the first power supply switching device S1 is turned on, and then, gradually increases with time.

Figure 4D:
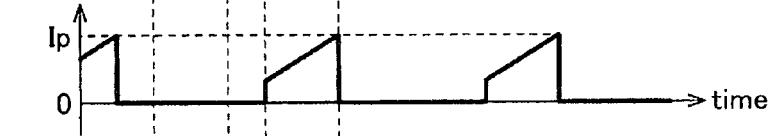
Figure 4E:
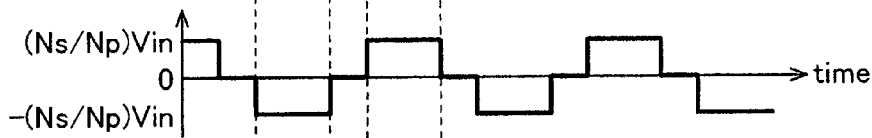
Figure 4F:
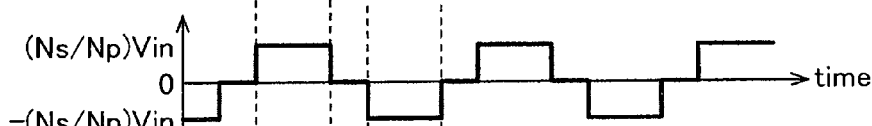
Figure 4G:
Figure 4H:
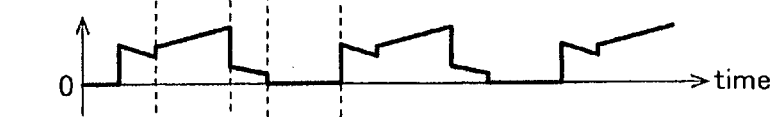

As shown in FIG. 4D, when the second power supply switching device S2 is turned on, the current I-T1B flowing in the second winding T1B of the primary winding T11 gradually increases with time. The number of turns of the first winding T1A and the second winding T1B of the primary winding T11 is "Np," and the number of turns of the first winding T1C and the second winding T1D of the secondary winding T12 is "Ns." Thus, as shown in FIG. 4F, during the "on" period S2on of the second power supply switching device S2, a voltage V-T1D of the second winding T1D based on the potential at the midpoint tap is "−(Ns/Np)Vin" V due to mutual induction of the transformer T1. At this time, since the second diode D2 is reversely biased, no current flows in the second winding T1D of the secondary winding T12, and as shown in FIG. 4H, the current I-D2 flowing in the second diode D2 toward the output positive line 51 is "0." On the other hand, as shown in FIG. 4E, during the "on" period S2on of the second power supply switching device S2, the voltage V-T1C of the first winding TIC based on the potential at the midpoint tap is "(Ns/Np)Vin" V due to mutual induction of the transformer T1. At this time, since the first diode D1 is forward biased, a current flows in a direction from the midpoint tap toward the end point in the first winding TIC of the secondary winding T12. Specifically, as shown in FIG. 4G, the current I-D1 flowing in the first diode D1 toward the output positive line 51 instantaneously increases to the same value as that of the current I-L1 (see FIG. 4I) that had flown in the first inductor LI immediately before the second power supply switching device S2 is turned on, and then, gradually increases with time.

Figure 4I:
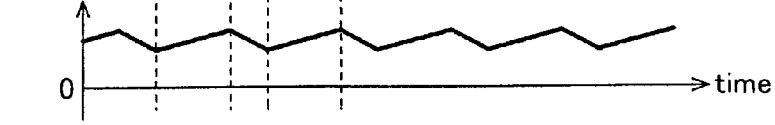

Then, as shown in FIG. 4I, the sum of the current I-D1 flowing in the first diode D1 and the current I-D2 flowing in the second diode D2 described above is the current I-L1 flowing in the inductor L1 on the output positive line 51. Note that, during the dead time in which both the first power supply switching device S1 and the second power supply switching device S2 are off, the current I-L1, which flows toward the output terminal O1 side of the inductor L1, gradually decreases with time from the value of the current I-L1 that has flown during the on state of one of the first power supply switching device S1 and the second power supply switching device S2. This is due to the function of the inductor L1 to suppress a change in current I-L1 flowing through the output positive line 51. In order to cause such a current I-L1 to flow in the inductor L1, as shown in FIGS. 4G and 4H, currents obtained by dividing the current I-L1 at a predetermined ratio flow through a path through the first winding T1C and the first diode D1, and a path through the second winding T1D and the second diode D2.

Thus, the output voltage V1 smoothed by the inductor L1 and the output smoothing capacitor C1 is output between the output positive line 51 and the output negative line 52, that is, between the output terminals O1. This output voltage V1 is a potential of the output positive line 51 based on the potential of the output negative line 52, and has a value shown in the following expression (2). In the expression, "Lon/T" corresponds to the on-duty of each power supply switching device S1, S2. Note that, to simplify the description, it is assumed herein that the respective forward voltages of the first diode D1 and the second diode D2 are 0 V.

$$V1=2(Lon/T)(Ns/Np)Vin \ [V] \quad (2)$$

The remaining five transformers T2 to T6 operate in exactly the same manner, and the respective output voltages V2 to V6 thereof have the same value as that of the output voltage V1.

Figure 5:
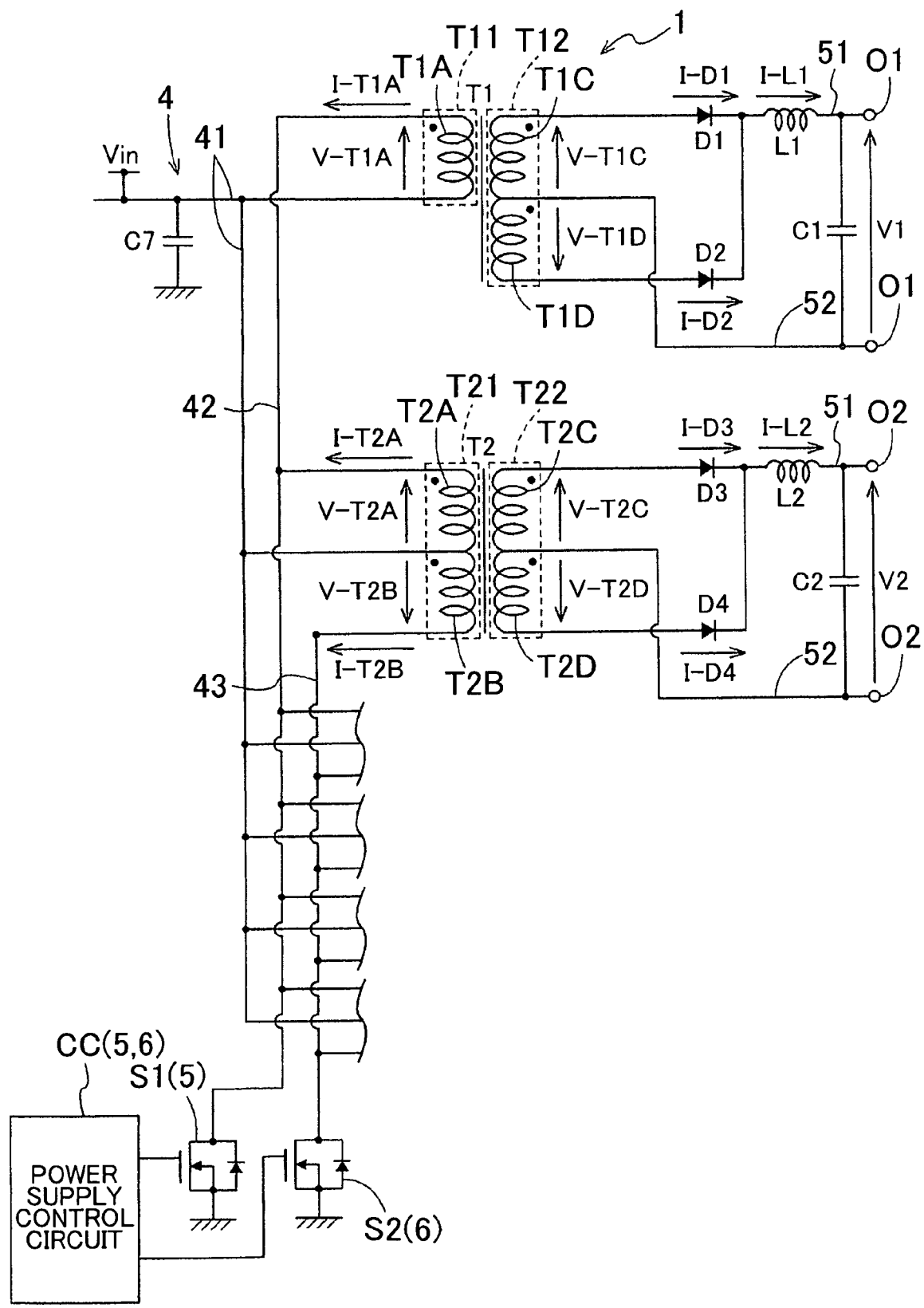
FIG. 5 is a circuit diagram illustrating an operation of the power supply circuit according to the embodiment of the present invention when a failure has occurred in one of windings of a primary winding.

4. Operation of the Power Supply Circuit when a Failure Has Occurred in One of the Windings of the Primary Winding The operation of the power supply circuit 1 when a failure has occurred in one of the first winding T1A to T6A and the second winding T1B to T6B of the primary winding T11 to T61 will be described below with reference to FIGS. 5 to 7. It is assumed herein that the second winding T1B of the primary winding T11 of the first transformer Ti does not work due to a failure, as shown in FIG. 5.

First, the operation of the first transformer T1 in which the failure has occurred will be described based on the timing charts of FIGS. 6A to 6G. Note that FIGS. 6A to 6G correspond to FIGS. 4A to 4I showing an operation of the first transformer T1 in the normal state. However, since the second winding T1B of the primary winding T11 is not working in this example, the voltage V-T1B of the second winding T1B and the current I-T1B flowing in the second winding T1B are not shown in FIGS. 6A to 6G.

Figure 6A:
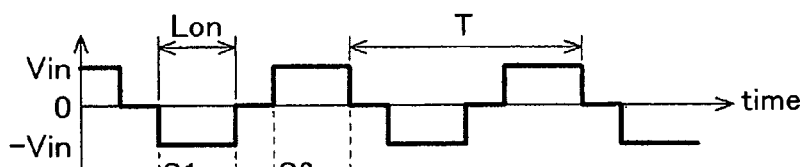
FIGS. 6A to 6G are timing charts illustrating the operation of the power supply circuit according to the embodiment of the present invention when a failure has occurred in one of the windings of the primary winding.
Figure 6B:
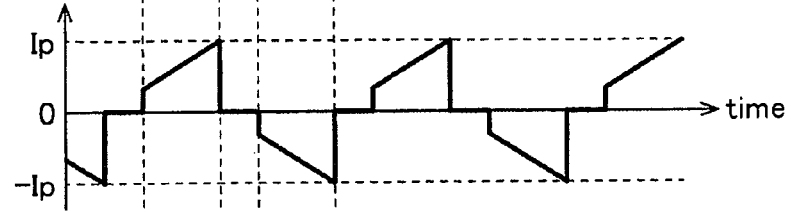
Figure 6C:
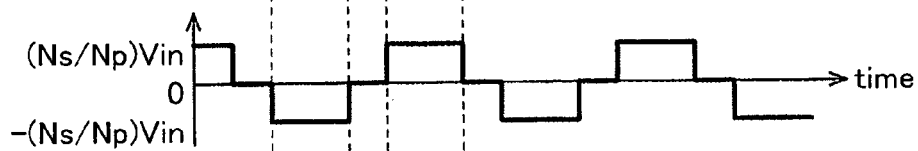
Figure 6D:
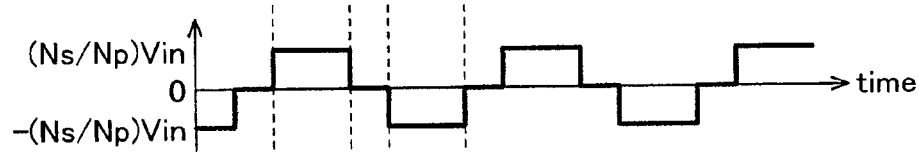
Figure 6E:
Figure 6F:
Figure 6G:
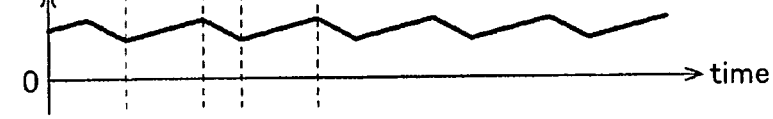

Even if a failure occurs in the primary winding T11 of the first transformer T1, the first power supply switching device S1 and the second power supply switching device S2 are alternately turned on by the power supply control circuit CC as in the case of the operation in the normal state. When the first power supply switching device S1 is turned on, the potential at the end point of the first winding T1A of the primary winding T11 becomes equal to the ground potential (0 V). At this time, the potential at the midpoint tap of the first winding T11 is equal to the primary-side voltage Vin. Thus, as shown in FIG. 6A, the voltage V-T1A of the first winding T1A based on the potential at the midpoint tap is "–Vin" V during the "on" period S1*on* of the first power supply switching device S1. At this time, as shown in FIG. 6B, the current I-T1A, which flows in a direction from the midpoint tap toward the end point in the first winding T1A, instantaneously increases to a fixed value, and then, gradually increases with time. Such an operation during the "on" period S1*on* of the first power supply switching device S1 is similar to that in the normal state described above. Thus, the largest value of the current I-T1A reached at the end of the "on" period S1*on* of the first power supply switching device S1 is "Ip."

On the other hand, when the second power supply switching device S2 is turned on, the second winding T1B of the primary winding T11, which is supposed to work, does not work. Thus, no voltage is generated in the primary winding T11 only by the first transformer T1. However, as described above regarding the operation in the normal state, in the other transformers T2 to T6 in which no failure has occurred, the respective voltages of the second windings T2B to T6B is "–Vin" V during the "on" period S2*on* of the second power supply switching device S2 (see FIG. 7B). Thus, the respective voltages of the first windings T2 to T6 become "Vin" V by mutual induction (see FIG. 7A). Therefore, during the "on" period S2*on* of the second power supply switching device S2, the potentials at the respective end points of the first windings T2A to T6A in the primary windings T21 to T61 of the transformers T2 to T6 are "2Vin" V while the potentials at the respective end points of the second windings T2B to T6B are the ground potential (0 V). Thus, the potential at the end point of the first winding T1A of the first transformer T1, which is electrically connected to the respective end points of the first windings T2A to T6A of the transformers T2 to T6 in the normal state, becomes equal to the potential "2Vin" V. This potential is higher than the potential "Vin" V at the midpoint tap of the primary winding T11 of the first transformer T1 by "Vin" V. Thus, as shown in FIG. 6A, the voltage V-T1A of the first winding T1A in the primary winding T11 of the first transformer T1 is "Vin" V during the "on" period S2*on* of the second power supply switching device S2. Thus, even if the second winding T1B of the primary winding T11 does not work in the first transformer T1, a voltage similar to that in the normal state is generated in the first winding T1A of the primary winding T11.

The potential at the end point of the first winding T1A in the primary winding T11 of the first transformer T1 is not a potential generated by the first winding T1A, but a potential raised by the potentials of the other transformers T2 to T6 connected to the end point of the first winding T1A. Thus, during the "on" period S2*on* of the second power supply switching device S2, a negative current I-T1A flows in a direction from the end point toward the midpoint tap in the first winding T1A. As shown in FIG. 6B, the absolute value of this current I-T1A instantaneously increases to a fixed value, and then, gradually increases with time. The largest value of the current I-T1A reached at the end of the "on" period S2*on* of the second power supply switching device S2 is "Ip" (actually "–Ip" in consideration of the sign). As shown in FIG. 3, in the normal state, the reference direction of the current I-T1B flowing in the second winding T1B is opposite to that of the current I-T1A. Thus, the current I-T1A that flows in the first winding T1A during the "on" period S2*on* of the second power supply switching device S2 is the same in magnitude and direction as the current I-T1B that flows in the second winding T1B of the primary winding T11 of the first transformer T1 in the normal state. Note that, as described below, the current flowing in the first winding T1A at this time comes from the primary windings T21 to T61 of the other transformers T1 to T6 connected to the first winding T1A.

As described above, according to the structure of the power supply circuit 1, the same current as the current I-T1B that flows in the second winding T1B in the normal state flows in the first winding T1A, when the second winding T1B that forms the primary winding T11 of the first transformer T1 does not work. That is, the first winding T1A operates both as the first and second windings T1A, T1B. Thus, as shown in FIGS. 6C to 6G, the operation on the secondary winding T12 side of the first transformer T1 is exactly the same as that in the normal state (see FIGS. 4E to 4I). Therefore, the output voltage V1 smoothed by the inductor L1 and the output smoothing capacitor C1 is output between the output positive line 51 and the output negative line 52, that is, between the output terminals O1, as in the case of the normal state.

An operation of the transformers T2 to T6 in which no failure has occurred will be described below with reference to the timing charts of FIGS. 7A to 7I. An operation of the second transformer T2 will be described representatively. Note that, since the other transformers T3 to T6 operate in a manner similar to that of the second transformer T2, description thereof will be omitted.

Figure 7A:
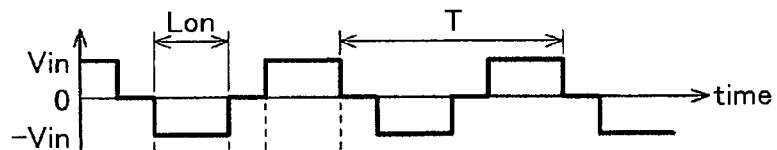
FIGS. 7A to 7I are timing charts showing the operation of the power supply circuit according to the embodiment of the present invention when a failure has occurred in one of the windings of the primary winding.
Figure 7B:
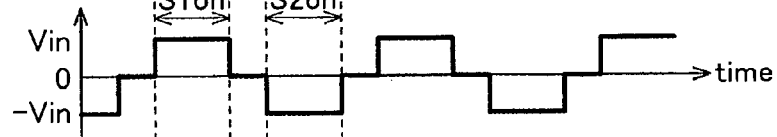
Figure 7C:
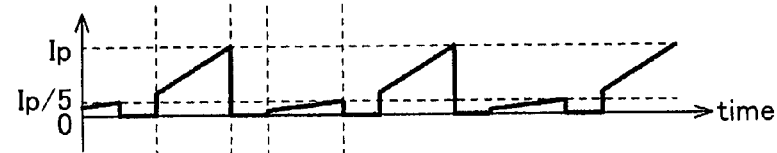

As described above, the first power supply switching device S1 and the second power supply switching device S2 are alternately turned on by the power supply control circuit CC. When the first power supply switching device 51 is turned on, the potential at the end point of the first winding T2A of the primary winding T21 becomes equal to the ground potential (0 V). At this time, the potential at the midpoint tap of the primary winding T21 is equal to the primary-side voltage Vin. Thus, as shown in FIG. 7A, the voltage V-T2A of the first winding T2A based on the potential at the midpoint tap is "–Vin" V during the "on" period S1*on* of the first power supply switching device S1. Since the first winding T2A and the second winding T2B of the primary winding T21 have the same number of turns (Np) and the same polarity, a voltage of the same magnitude and the same direction as those of the voltage of the first winding T2A is generated in the second winding T2B of the primary winding T21 by mutual induction. Thus, as shown in FIG. 7B, the voltage V-T2B of the second winding T2B based on the potential at the midpoint tap is "Vin" V during the "on" period S1*on* of the first power supply switching device S1. At this time, as shown in FIG. 7C, a current I-T2A flowing in a direction from the midpoint tap toward the end point in the first winding T2A instantaneously increases to a fixed value, and then, gradually increases with time. Such an operation of the first power supply switching device S1 during the "on" period S1*on* is similar to that in the normal state described above (see FIGS. 4A and 4B). Thus, the largest value of the current I-T2A reached at the end of the "on" period S1*on* of the first power supply switching device S1 is "Ip." On the other hand, since the second power supply switching device S2 is off, no current flows in the second winding T2B, and as shown in FIG. 7D, a current I-T2B that flows in a direction from the midpoint tap toward the end point in the second winding T2B is "0."

When the second power supply switching device S2 is turned on, the potential at the end point of the second winding T2 becomes equal to the ground potential (0 V). At this time, the potential at the midpoint tap of the primary winding T21 is equal to the primary-side voltage Vin. Thus, as shown in FIG. 7B, the voltage V-T2B of the second winding T2B is "−Vin" V during the "on" period S2*on* of the second power supply switching device S2. At this time, a voltage of the same magnitude and the same direction as those of the voltage of the second winding T2B is generated in the first winding T2A of the primary winding T21 by mutual induction. Thus, as shown in FIG. 7A, the voltage V-T2A of the first winding T2A is "Vin" V during the "on" period S2*on* of the second power supply switching device S2. The voltage V-T2B of the second winding T2B and the voltage V-T2A of the first winding T2A during the "on" period S2*on* of the second power supply switching device S2 behave in a manner similar to that in the normal state described above (see FIGS. 4A and 4B). On the other hand, the current I-T2A flowing in the first winding T2A and the current I-T2B flowing in the second winding T2B during the "on" period S2*on* of the second power supply switching device S2 behave in a manner somewhat different from that in the normal state.

That is, as described above, a negative current I-T1A flows in a direction from the end point toward the midpoint tap in the first winding T1A of the primary winding T11 of the first transformer T1. As shown in FIG. 6B, the absolute value of this current I-T1A instantaneously increases to a fixed value, and then, gradually increases with time. The largest value of the current I-T1A is "Ip" (actually "−Ip" in consideration of the sign). This current I-T1A flows into the primary winding T11 of the first transformer T1 through the primary windings T21 to T61 of the transformers T2 to T6 other than the first transformer T1. Specifically, the current I-T1A flowing in the first winding T1A that forms the primary winding T11 of the first transformer T1 is equally divided into five, and the resultant five currents flow in the first windings T2A to T6A of the primary windings T21 to T61 of the remaining five transformers T2 to T6, respectively. Thus, despite that the first power supply switching device S1 is off, the current I-T2A, which has a value equal to "⅕ (one-fifth)" of the current I-T1A flowing in the first winding T1A of the first transformer T1, flows in a direction from the midpoint tap toward the end point in the first winding T2A that forms the primary winding T21 of the second transformer T2, as shown in FIG. 7C. Therefore, the largest value of the current I-T2A reached at the end of the "on" period S2*on* of the second power supply switching device S2 is "Ip/5."

Figure 7D:
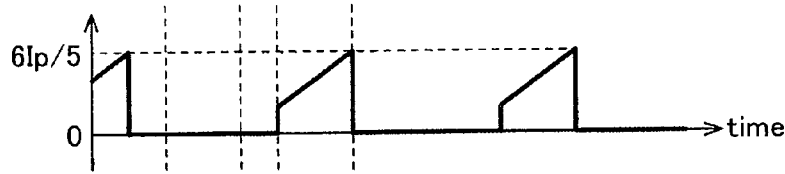
Figure 7E:
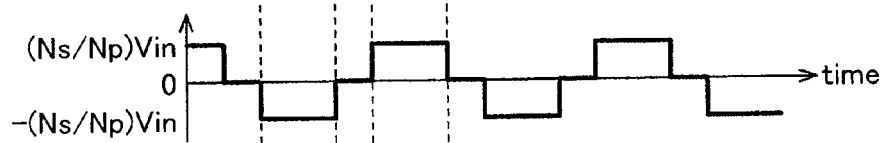
Figure 7F:
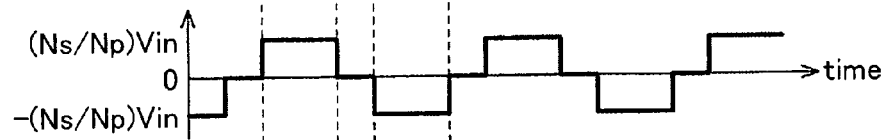
Figure 7G:
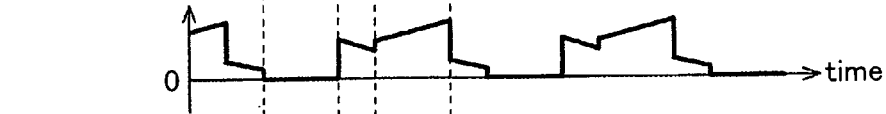
Figure 7H:
Figure 7I:
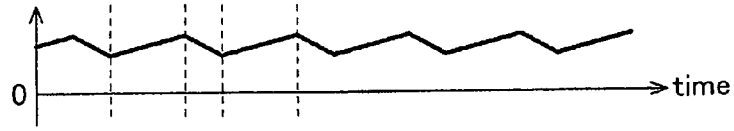

On the other hand, as shown in FIG. 7D, the current I-T2B flowing in a direction from the midpoint tap toward the end point in the second winding T2B that forms the primary winding T21 of the second transformer T2 instantaneously increases to a fixed value, and then, gradually increases with time. Such a behavior of the current I-T2B itself is similar to that in the normal state. However, a current corresponding to an increase in current I-T2A flowing in the first winding T2A (the largest value is "Ip/5") flows in the second winding T2B, in addition to the current flowing in the second winding T2B in the normal state (the highest value is "Ip"). The current corresponding to an increase in current I-T2A flows in a direction opposite to that of the current I-T2A, that is, a direction from the midpoint tap toward the end point in the second winding T2B. Thus, the current I-T2B flowing in the second winding T2B is larger than the current value flowing in the normal state by 20% (⅕ (one-fifth)). Therefore, the largest value of the current I-T2B reached at the end of the "on" period S2*on* of the second power supply switching device S2 is "6Ip/5."

As shown in FIGS. 7E to 7I, the operation on the secondary winding T22 side of the second transformer T2 is exactly the same as that in the normal state (see FIGS. 4E to 4I). Thus, the output voltage V2 smoothed by the inductor L2 and the output smoothing capacitor C2 is output between the output positive line 51 and the output negative line 52, that is, between the output terminals O2, as in the normal state.

Note that, although the above example has been described with respect to the case where a failure has occurred in the second winding T1B that forms the primary winding T11 of the first transformer T1, the power supply circuit 1 operates similarly even if the first winding T1A of the primary winding T11 does not work due to a failure. Moreover, the power supply circuit 1 operates similarly also when one of the first winding T2A to T6A and the second winding T2B to T6B of the primary winding T21 to T61 in any of the transformers T2 to T6 other than the first transformer T1 does not work due to a failure.

The present embodiment is described with respect to an example in which the power supply circuit 1 has six transformers. However, the largest value of the current, which flows in the primary windings of the remaining transformers (the transformers in which a failure has not occurred) when a failure has occurred in one of the first and second windings of the primary winding of any of the transformers, may be represented by a general expression by using the number "N" of transformers included in the power supply circuit 1, and the largest value "Ip" of the current-flowing in each of the first and second windings that form the primary windings when all the transformers are in the normal state. That is, it is assumed herein that a failure has occurred in one of the first and second windings of the primary winding of any one of the transformers, and the other winding is in the normal state. If one of the first and second windings of each of the other transformers in which a failure has not occurred is referred to as a failure-side winding, and the other winding is referred to as a normal-side winding, the largest value of the current flowing in each of the respective normal-side windings of the transformers in which a failure has not occurred is "Ip." On the other hand, as described above, the current flowing in the transformer in which a failure has occurred is equally divided into (N−1), and the resultant (N−1) currents flow in the failure-side windings of the remaining number (N−1) of the transformers in which a failure has not occurred. Thus, the sum of the largest value "Ip" of the current in the normal state and "{1/(N−1)}Ip" flows as the largest value. That is, the largest value of the current flowing in the respective failure-side windings of the transformers in which a failure has not occurred is "{1+1/(N−1)}Ip." Thus, the largest value of the current in the entire primary winding of each transformer in which a failure has not occurred is also "{1+1/(N−1)}Ip."

Figure 8:
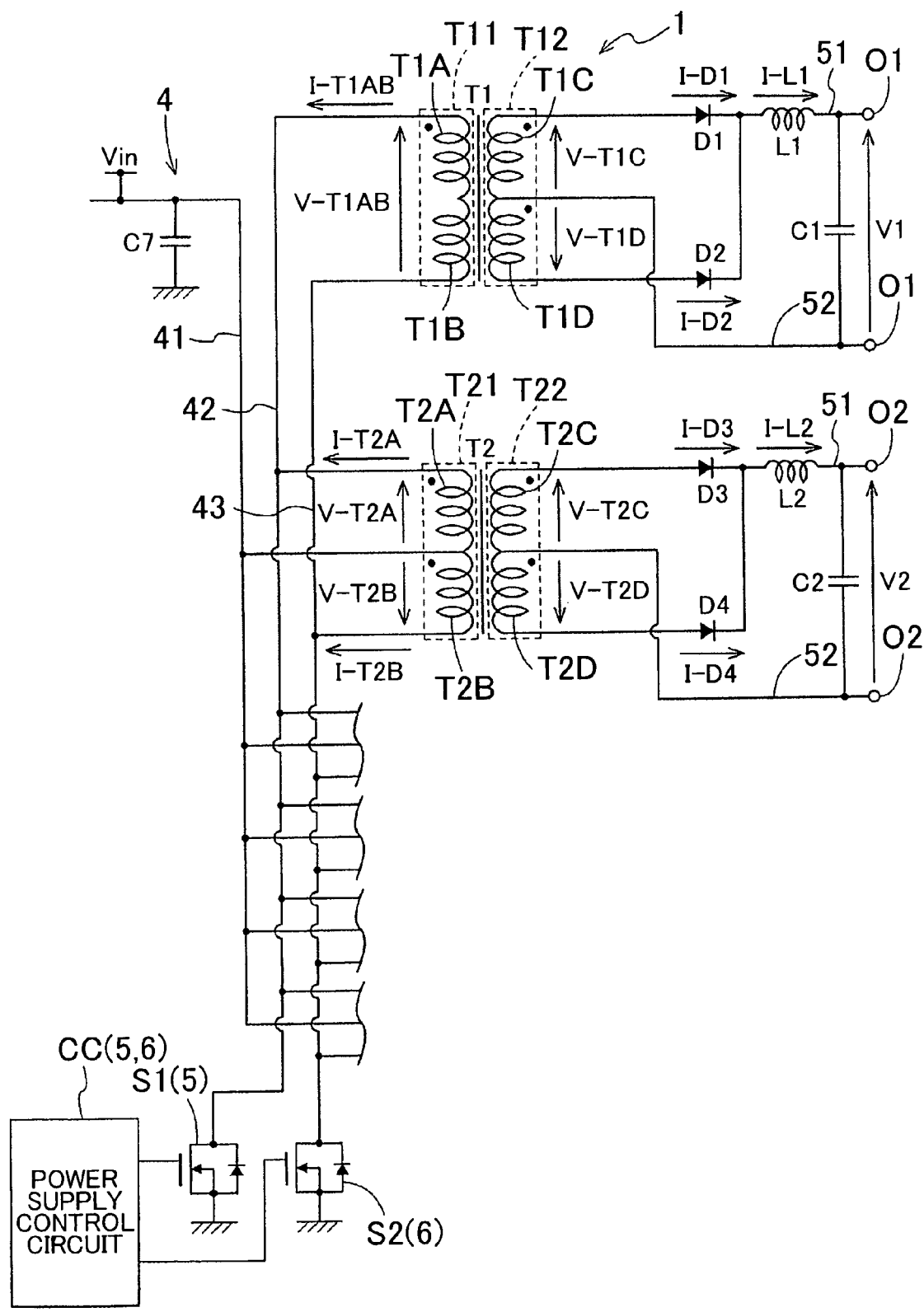
FIG. 8 is a circuit diagram illustrating an operation of the power supply circuit according to the embodiment of the present invention when a failure has occurred in a midpoint tap of the primary winding.

5. Operation of the Power Supply Circuit when a Failure Has Occurred in the Midpoint Tap The operation of the power supply circuit 1 when a failure has occurred in the midpoint tap of the primary winding T11 to T61 will be described with reference to FIGS. 8 to 10. As shown in FIG. 8, an example will be herein described in which the midpoint tap of the primary winding T11 of the first transformer T1 does not work due to a failure, and the primary-side voltage Vin from the primary-side power source 4 is not applied to the primary winding T11 of the first transformer T1.

First, the operation of the first transformer T1 in which a failure has occurred will be described with reference to the timing charts of FIGS. 9A to 9G. Note that FIGS. 9A to 9G corresponds to FIGS. 4A to 4I showing the operation of the first transformer Ti in the normal state. However, since the midpoint tap of the primary winding T11 is not working in this example, the voltage that is applied to the primary winding T11 is represented as a voltage V-T1AB of the primary winding T11, which is not based on the potential at the midpoint tap, but is based on the potential at the end point of the secondary winding T1B.

Even if a failure occurs in the primary winding T11 of the first transformer T1, the first power supply switching device S1 and the second power supply switching device S2 are alternately turned on by the power supply control circuit CC as in the case of the operation in the normal state. When the first power supply switching device S1 is turned on, the potential at the end point of the first winding T1A in the primary winding T11 of the first transformer T1 becomes equal to the ground potential (0 V). When the second power supply switching device S2 is turned on, the potential at the end point of the second winding T1B in the primary winding T11 of the first transformer T1 becomes equal to the ground potential (0 V). In this example, however, since the midpoint tap of the primary winding T11 does not work due to a failure, the primary-side voltage Vin from the primary-side power source 4 is not applied to the primary winding T11 of the first transformer T1. Thus, no voltage is generated in the primary winding T11 only by the first transformer T1.

On the other hand, as described above regarding the operation in the normal state, during the "on" state S1on of the first power supply switching device S1, the respective voltages of the second windings T2B to T6B of the other transformers T2 to T6 in which a failure has not occurred is "Vin" V due to mutual induction (see FIG. 10B), and the potential with respect to the ground becomes "2Vin" V. Similarly, during the "on" period S2on of the second power supply switching device S2, the respective voltages of the first windings T2A to T6A are "Vin" V due to mutual induction (see FIG. 10A), and the potential with respect to the ground is "2Vin" V. Since the primary winding T11 of the first transformer T1 in which a failure has occurred is electrically connected to the primary windings T21 to T61 of the transformers T2 to T6 in the normal state, the potential at both ends of the primary winding T11 of the first transformer T1 is the same as the potential at both ends of the respective primary windings T21 to T61 of the other transformers T2 to T6 in the normal state. That is, the potential at the end point of the second winding T1B in the primary winding T11 of the first transformer T1 is "2Vin" V during the "on" period S1on of the first power supply switching device S1, and the potential at the end point of the first winding T1A in the primary winding T11 of the first transformer T1 is "2Vin" V during the "on" period S2on of the second power supply switching device S2. Thus, as shown in FIG. 9A, the voltage V-T1AB of the primary winding T11 of the first transformer T1 is "−2Vin" V during the "on" period S1on of the first power supply switching device S1, and the voltage V-T1AB of the primary winding T11 of the first transformer T1 is "2Vin" V during the "on" period S2on of the second power supply switching device S2. Thus, even if the midpoint tap does not work in the first transformer T1, a voltage similar to that in the normal state is generated at both ends of the primary winding T11.

The higher potential ("2Vin" V) in the primary winding T11 of the first transformer Ti is not a potential generated by the primary winding T11, but a potential raised by the potentials of the other transformers T2 to T6 connected to the end point of the primary winding T11. Thus, during the "on" period S1on of the first power supply switching device S1, a positive current I-T1AB flows in a direction from the end point of the second winding T1B toward the end point of the first winding T1A in the primary winding T11. As shown in FIG. 9B, this current I-T1AB instantaneously increases to a fixed value, and then, gradually increases with time. The largest value of the current I-T1AB reached at the end of the "on" period S1on of the first power supply switching device S1 is "Ip/2." Similarly, during the "on" period S2on of the second power supply switching device S2, a negative current I-T1AB flows in a direction from the end point of the first winding T1A toward the end point of the second winding T1B in the primary winding T11. As shown in FIG. 9B, the absolute value of the current I-T1AB instantaneously increases to a fixed value, and then, gradually increases with time. The largest value of the current I-T1AB reached at the end of the "on" period S2on of the second power supply switching device S2 is "Ip/2" (actually "−Ip/2" in consideration of the sign).

As shown in FIG. 8, the midpoint tap does not work in the primary winding T11 of the first transformer T1, and the first winding T1A and the second winding T1B of the primary winding T11 function integrally. Thus, in the primary winding T11, the number of turns is doubled (2Np), and the voltage at both ends is also doubled ("2Vin" V) with respect to the first winding T1A or the second winding T1B in the normal state. Therefore, the magnitude of the current flowing in the primary winding T11 is "½ (one-half)" of the current flowing in the normal state. Note that, as described below, the current flowing in the primary winding T11 during the "on" period S1on of the first power supply switching device S1 and the "on" period S2on of the second power supply switching device S2 comes from the primary windings T21 to T61 of the other transformers T2 to T6 connected to the primary winding T11.

As described above, according to the structure of the power supply circuit 1, the number of turns of the primary winding T11 is doubled (2Np), and the magnitude of the current I-T1AB flowing in the primary winding T11 is "½ (one-half)" of the current flowing in the normal state, in the case where the midpoint tap of the primary winding T11 of the first transformer T1 does not work. Thus, the operation on the primary winding T11 side is different from that in the normal state. However, the operation on the secondary winding T12 side of the first transformer T1 is exactly the same as that in the normal state, as shown in FIGS. 9C to 9G (see FIGS. 4E to 4I). Thus, the output voltage V1 smoothed by the inductor L1 and the output smoothing capacitor C1 is output between the output positive line 51 and the output negative line 52, that is, between the output terminals O1, as in the case of the normal state.

The operation of the transformers T2 to T6 in which a failure has not occurred will be described below with reference to the timing charts of FIGS. 10A to 10I. The second transformer T2 will be described below representatively. Note that, since the remaining transformers T3 to T6 operate in a manner similar to that of the second transformer T2, description thereof will be omitted.

Figure 10A:
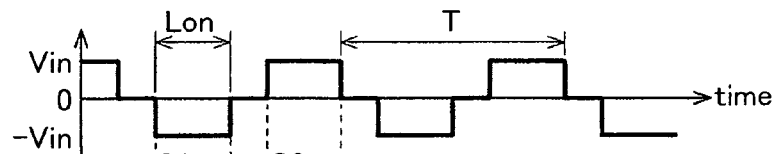
FIGS. 10A to 10I are timing charts illustrating the operation of the power supply circuit according to the embodiment of the present invention when a failure has occurred in a midpoint tap of the primary winding.
Figure 10B:
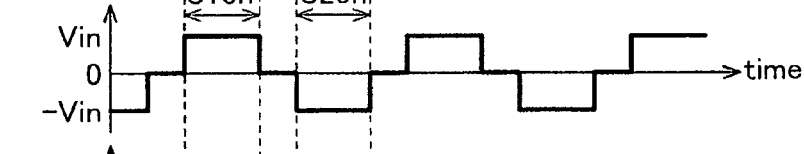

As described above, the first power supply switching device S1 and the second power supply switching device S2 are alternately turned on by the power supply control circuit CC. As shown in FIGS. 10A and 10B, the voltage V-T2A of the first winding T2A and the voltage V-T2B of the second winding T2B in the primary winding T21 of the second transformer T2 in which a failure has not occurred behave in a manner similar to that in the normal state (see FIGS. 4A and 4B). On the other hand, the current I-T2A flowing in the first winding T2A and the current I-T2B flowing in the second winding T2B during the "on" period S1on of the first power supply switching device S1 and the "on" period S2on of the second power supply switching device S2 behave in a manner somewhat different from that in the normal state.

That is, as described above, a positive current I-T1AB flows in a direction from the end point of the second winding T1B toward the end point of the first winding T1A in the primary winding T11 of the first transformer T1 during the "on" period S1on of the first power supply switching device S1. A negative current I-T1AB flows in a direction from the end point of the first winding T1A toward the end point of the second winding T1B in the primary winding T11 of the first transformer T1 during the "on" period S2on of the second power supply switching device S2. As shown in FIG. 9B, the absolute value of this current I-T1AB instantaneously increases to a fixed value, and then, gradually increases with time. The largest absolute value of this current I-T1AB is "Ip/2." This current I-T1AB flows into the primary winding T11 of the first transformer T1 through the respective primary windings T21 to T61 of the transformers T2 to T6 other than the first transformer T1. Specifically, the current I-T1AB flowing into the first winding T1A of the primary winding T11 of the first transformer T1 is equally divided into five, and the resultant five currents flow into the first windings T2A to T6A of the primary winding T21 to T61 of the remaining five transformers T2 to T6.

Figure 10C:
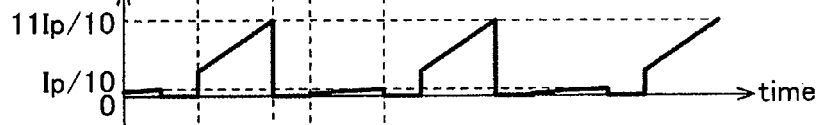
Figure 10D:
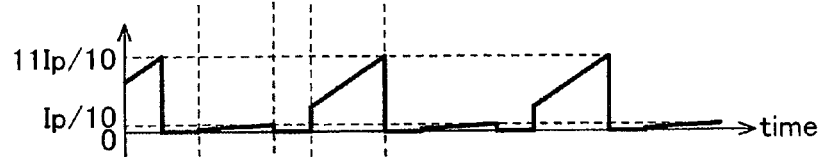
Figure 10E:
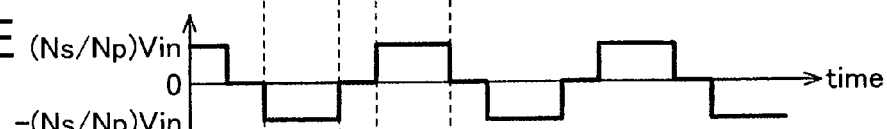
Figure 10F:
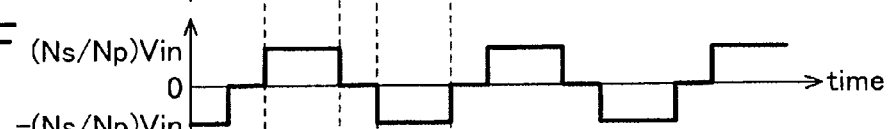
Figure 10G:
Figure 10H:
Figure 10I:
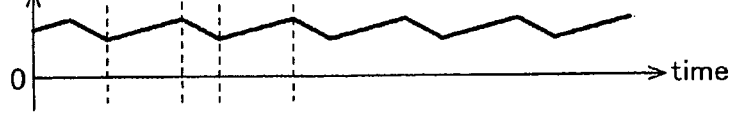

Thus, during the "on" period S1on of the first power supply switching device S1, the current I-T2B, which has a value equal to "⅕ (one-fifth)" of the current I-T1AB flowing in the primary winding T11 of the first transformer T1, flows in a direction from the midpoint tap toward the end point in the second winding T2B of the primary winding T21 of the second transformer T2, as shown in FIG. 10D, despite that the second power supply switching device S2 is off Thus, the largest value of the current I-T2B reached at the end of the "on" period S1on of the first power supply switching device S1 is "Ip/10." On the other hand, the current I-T2A, which flows in a direction from the midpoint tap toward the end point in the first winding T2A that forms the primary winding T21 of the second transformer T2, instantaneously increases to a fixed value, and then, gradually increases with time, as shown in FIG. 10C. Such a behavior of the current I-T2A itself is similar to that in the normal state. However, a current corresponding to an increase in current I-T2B flowing in the second winding T2B (the largest value is "Ip/10") flows in the first winding T2A, in addition to the current flowing in the first winding T2A in the normal state (the highest value is "Ip"). The current corresponding to an increase in current I-T2B flows in a direction opposite to that of the current I-T2B, that is, a direction from the midpoint tap toward the end point in the first winding T2A. Thus, the current I-T2A flowing in the first winding T2A is larger than the current value flowing in the normal state by 10% (¹⁄₁₀ (one-tenth)). Therefore, the largest value of the current I-T2A reached at the end of the "on" period S1on of the first power supply switching device S1 is "11Ip/10."

Similarly, during the "on" period S2on of the second power supply switching device S2, the current I-T2A, which has a value equal to "⅕ (one-fifth)" of the current I-T1AB flowing in the primary winding T11 of the first transformer T1, flows in a direction from the midpoint tap toward the end point in the first winding T2A of the primary winding T21 of the second transformer T2, as shown in FIG. 10C, despite that the first power supply switching device S1 is off On the other hand, the current I-T2B, which flows in a direction from the midpoint tap toward the end point in the second winding T2B of the primary winding T21 of the second transformer T2, instantaneously increases to a fixed value, and then, gradually increases with time, as shown in FIG. 10D. At this time, a current corresponding to an increase in current I-T2A flowing in the first winding T2A (the largest value is "Ip/10") flows in the second winding T2B, in addition to the current flowing in the second winding T2B in the normal state (the highest value is "Ip"). Thus, the current I-T2B flowing in the second winding T2B is larger than the current value flowing in the normal state by 10% (¹⁄₁₀ (one-tenth)). Therefore, the largest value of the current I-T2B reached at the end of the "on" period S2on of the second power supply switching device S2 is "11Ip/10."

As shown in FIGS. 10E to 10I, the operation on the secondary winding T22 side of the second transformer T2 is exactly the same as that in the normal state (see FIGS. 4E to 4I). Thus, the output voltage V2 smoothed by the inductor L2 and the output smoothing capacitor C2 is output between the output positive line 51 and the output negative line 52, that is, between the output terminals O2, as in the case of the normal state.

Note that the above example has been described with respect to the case where a failure has occurred in the midpoint tap of the primary winding W11 of the first transformer T1. However, the power supply circuit 1 operates in a manner similar to that described above even if the midpoint tap of the primary winding T21 to T61 in any of the transformers T2 to T6 other than the first transformer T1 does not work due to a failure. Moreover, the present invention is not limited to the case where a failure occurs in the midpoint tap itself, but the power supply circuit 1 operates in a manner similar to that described above even if a failure occurs in a portion of the wiring from the positive terminal of the primary-side power source 4 to the midpoint tap of any of the transformers T1 to T6.

The present embodiment is described with respect to the example in which the power supply circuit 1 has six transformers. As described above, however, when a failure has occurred in the midpoint tap of the primary winding of any of the transformers, the largest value of the current, which flows in the primary windings of the other transformers (the transformers in which a failure has not occurred), may be represented by a general expression by using the number "N" of transformers included in the power supply circuit 1, and the largest value "Ip" of the current flowing in each of the first and second windings of the primary windings when all the transformers are in the normal state. That is, in the case where a failure has occurred in the midpoint tap of the primary winding of any one of the transformers, the current flowing in the transformer in which a failure has occurred is equally divided into (N−1), and the resultant (N−1) currents respectively flow in the first windings or the second windings of the respective primary windings of the number (N−1) of the transformers in which a failure has not occurred. Thus, the sum of the largest value "Ip" of the current in the normal state and "[1/{2(N−1)}]Ip" flows as the largest value. That is, the largest value of the current flowing in each of the respective failure-side windings of the transformers in which a failure has not occurred is "[1+1/{2(N−1)}]Ip." Thus, the largest value of the current in the entire primary winding of each transformer in which a failure has not occurred is also "[1+1/{2(N−1)}]Ip."

6. Setting of the Cores of the Transformers

As described above, the largest value of the current that flows in the primary winding of each transformer in which a failure has not occurred when a failure has occurred one of the first and second windings of the primary winding of any of the transformers is larger than the largest value of the current that flows in the primary winding of each transformer in which a failure has not occurred when a failure has occurred in the midpoint tap of the primary winding of any of the transformers. The largest value of the current that flows in the primary winding of each transformer in which a failure has not occurred is represented by "$\{1+1/(N-1)\}Ip$." Thus, by setting the saturation magnetic flux density Bs of each core so that magnetic flux saturation of the core of each transformer does not occur by "$\{1+1/(N-1)\}Ip$," the operation of each transformer can be ensured even if a failure, such as a disconnection or a defective contact, occurs in or near the primary winding of any of the transformers.

The magnetic flux flowing in the core of each transformer is proportional to the current flowing in the windings of each transformer. Thus, in this power supply circuit 1, as shown by the above expression (1), the saturation magnetic flux density Bs of the core of each transformer is set to a value that is equal to or larger than $\{1+1/(N-1)\}$ times the required saturation magnetic flux density Bn, where the required saturation magnetic flux density Bn is the minimum saturation magnetic flux density required to prevent magnetic saturation from being caused even by the largest value Ip of the current that flows in the primary windings in the normal state where there is no defective portion in the circuit in which the number N of the transformers are provided. In the present invention, the power supply circuit 1 includes six transformers T1 to T6 (N=6). Thus, the saturation magnetic flux density Bs of the core of each transformer T1 to T6 is set to a value that is equal to or larger than "6/5 (six-fifth)" times the required saturation magnetic density Bn.

Setting the saturation magnetic flux density Bs of each core has the following effect. When a failure has occurred in a portion of a primary winding of any of the plurality of transformers, a current flowing in the primary winding in which a failure has occurred is equally divided, and the resultant currents respectively flow into the other transformers in which a failure has not occurred. This prevents magnetic saturation from occurring in the cores of the primary windings of the transformers in which a failure has not occurred. Thus, the current flowing in the primary winding of the transformer in which a failure has occurred can be supplied from the transformers in which a failure has not occurred. As a result, the primary winding of the transformer in which a failure has occurred can be reliably made to operate in a manner similar to the transformers in which a failure has not occurred.

Setting of the lower limit of the saturation magnetic flux density Bs of the core of each transformer has been described above. The upper limit of the saturation magnetic flux density Bs of the core of each transformer is not specifically limited, and can be set arbitrarily. Thus, it is preferable to determine an appropriate material, structure, shape, and the like in view of the easiness and the cost of manufacturing and the like within such a range that the saturation magnetic flux density Bs of the core becomes equal to or higher than the above lower limit. However, with regard to the largest value of the current that flows in the primary winding of one transformer in the state where the output voltage similar to that in the normal operation can be generated even if a failure has occurred in the primary windings, such largest value of the current is "$N \cdot Ip$". This largest current value ($N \cdot Ip$) corresponds to the current value that flows in the primary winding in which a failure has not occurred, in the case where a failure has not occurred in only one of the primary windings of the number N of the transformers, and a failure has occurred in one of the first and second winding in each primary winding of the remaining number (N−1) of the transformers. By setting the saturation magnetic flux density Bs of each core so that the magnetic flux saturation is not caused by this largest current value ($N \cdot Ip$) in the core of each transformer, operation of each transformer can be ensured even if a failure has occurred in the primary windings of the number (N−1) of the transformers as described above. On the contrary, no current exceeding the largest current value ($N \cdot Ip$) flows in the primary windings in the state where the output voltage similar to that in the normal operation can be generated. Thus, it is not necessary to set the saturation magnetic flux density Bs of the core of each transformer in consideration of a current value larger than ($N \cdot Ip$). From this point, it is preferable to set the saturation magnetic flux density Bs of the core of each transformer to a value that is equal to or less than N times the required saturation magnetic flux density Bn. In this case, the saturation magnetic flux density Bs of the core of each transformer can be set according to the following expression (3), in view of the lower limit described above.

$$\{1+1/(N-1)\}Bn \leq Bs \leq N \cdot Bn \tag{3}$$

Note that, in addition to the above setting of the saturation magnetic flux density Bs, in the case of, e.g., setting the saturation magnetic flux density Bs of the core of each transformer so as to tolerate a failure occurring in the primary windings of up to the number (N/2) of the transformers among the number N of the transformers, it is preferable to set the saturation magnetic flux density Bs to a value that is equal to or less than two times the required saturation magnetic flux density Bn. Thus, it is preferable to set the upper limit of the saturation magnetic flux density Bs of the core of each transformer as appropriate according to the acceptable level of failure, in view of the conditions of use of the power supply circuit 1, and the like.

7. Other Embodiments (1) The above embodiment has been described mainly with respect to the example in which the power supply circuit 1 includes six transformers T1 to T6, and the number of transformers is generalized as N (N is an integer equal to or larger than 2) only in a part of the description regarding the expressions and the like. It is to be understood that the number of transformers included in the power supply circuit 1 of the present invention is not limited to 6, and the preset invention may be similarly applied to any number of transformers equal to or larger than 2. Thus, it is also one of preferred embodiments of the present invention that the power supply circuit 1 include, e.g., four transistors or twelve transistors, or include seven or more transformers.

(2) The above embodiment has been described with respect to the example in which FETs are used as the first power supply switching device S1 and the second power supply switching device S2. However, a specific structure of these switching devices is not limited to this, and for example, power transistors of various known structures, such as IGBTs or bipolar transistors, may be preferably used as the power supply switching devices S1, S2. Similarly, the inverter switching devices 3 of the inverter circuit 2 are not limited to IGBTs, and power transistors of various known structures, such as FETs or bipolar transistors, may be preferably used as the inverter switching devices 3.

(3) The above embodiment has been described with respect to the example in which the power supply circuit 1 of the present invention drives the inverter circuit 2 for driving the electric motor 21. However, embodiments of the present invention are not limited to this. For example, the present invention may be preferably used as an inverter drive power supply circuit for driving a plurality of inverter switching devices in inverter circuits for use in various known applications, such as a power supply unit.

The present invention can be preferably used as an inverter drive power supply circuit for driving a plurality of inverter switching devices that form an inverter circuit.

What is claimed is:

1. An inverter drive power supply circuit for driving a plurality of inverter switching devices that form an inverter circuit, comprising:
   a number N of transformers (N is an integer equal to or larger than 2) adapted to a push-pull method, each having a first winding and a second winding for a primary winding and a first winding and a second winding for a secondary winding, and supplying an output voltage of the secondary winding to the inverter switching devices, wherein
   one end of the respective first windings of the number N of the primary windings and one end of the respective second windings of the number N of the primary windings are connected to each other and connected to a primary-side power source that applies a primary-side voltage,
   the other end of the respective first windings of the number N of the primary windings are connected to each other and are connected in parallel to the primary-side power source via a first power supply control section, and the other end of the respective second windings of the number N of the primary windings are connected to each other and are connected in parallel to the primary-side power source via a second power supply control section, and
   a saturation magnetic flux density of a core of each transformer is set to a value that is equal to or higher than $\{1+1/(N-1)\}$ times a required saturation magnetic flux density, which is a minimum saturation magnetic flux density required to prevent magnetic saturation from being caused even by a largest value of a current that flows in the primary windings in a normal state where there is no defective portion in the circuit in which the number N of the transformers are formed.

2. The inverter drive power supply circuit according to claim 1, wherein
   one end of the respective first windings of the number N of the secondary windings and one end of the respective second windings of the number N of the secondary windings are connected to each other and connected to an output terminal which outputs the output voltage, and
   the other end of the respective first windings of the number N of the secondary windings and the other end of the respective second windings of the number N of the secondary windings are connected to each other and are connected to another output terminal.

* * * * *